United States Patent [19]
Kubota et al.

[11] Patent Number: 5,670,963
[45] Date of Patent: Sep. 23, 1997

[54] RADAR APPARATUS OF AUTOMOTIVE VEHICLE FOR PRODUCING ACCURATE BEAM AXIS CORRECTION VALUE

[75] Inventors: Yuichi Kubota; Setsuo Tokoro, both of Susono, Japan

[73] Assignee: Toyota Jidosha Kabushiki Kaisha, Toyota, Japan

[21] Appl. No.: 610,685

[22] Filed: Mar. 4, 1996

[30] Foreign Application Priority Data

Mar. 17, 1995 [JP] Japan ................................ 7-059552
Oct. 12, 1995 [JP] Japan ................................ 7-264300

[51] Int. Cl.⁶ ............................................... G01S 13/93
[52] U.S. Cl. ............................................ 342/70; 342/71
[58] Field of Search .............................. 342/70, 71, 72, 342/77

[56] References Cited

U.S. PATENT DOCUMENTS

| | | | |
|---|---|---|---|
| 4,150,375 | 4/1979 | Ross et al. | 342/21 |
| 4,165,511 | 8/1979 | Wocher et al. | 342/70 |
| 4,308,536 | 12/1981 | Sims, Jr. et al. | 342/70 |
| 5,389,931 | 2/1995 | Anderson et al. | 342/70 |
| 5,402,129 | 3/1995 | Gellner et al. | 342/70 |

FOREIGN PATENT DOCUMENTS

| | | |
|---|---|---|
| 4-57781 | 5/1992 | Japan |
| 5-157843 | 6/1993 | Japan |
| 6-160510 | 6/1994 | Japan |

*Primary Examiner*—John B. Sotomayor
*Attorney, Agent, or Firm*—Kenyon & Kenyon

[57] ABSTRACT

A radar apparatus of an automotive vehicle includes a radar unit which outputs signals at intervals of a predetermined time, each signal indicating data of a position of a target at an output time. A position detecting unit detects data of the position of the target from the signals output by the radar unit when the vehicle operates in a straight line path. A correction value determining unit generates a set of errors of a beam emission axis to the straight line path with respect to a horizontal direction so that an average of the errors with respect to each of the signals is determined from the data detected by the position detecting unit. The correction value determining unit determines a correction value by taking an average of the averages of the errors with respect to all the signals.

8 Claims, 11 Drawing Sheets

5,670,963

RADAR APPARATUS OF AUTOMOTIVE VEHICLE FOR PRODUCING ACCURATE BEAM AXIS CORRECTION VALUE

BACKGROUND OF THE INVENTION

(1) Field of the Invention

The present invention generally relates to a radar apparatus of an automotive vehicle, and more particularly to a radar apparatus of an automotive vehicle which detects a distant object, such as an advancing vehicle, and finds a position of the object relative to the radar apparatus.

(2) Description of the Related Art

A radar apparatus of an automotive vehicle which emits a radar beam in a forward direction of the vehicle to measure a position of a target, such as a road-side object or an advancing vehicle, is known.

Japanese Laid-Open Patent Application No.6-160510 discloses a radar apparatus of an automotive vehicle. This radar apparatus detects a locus of a specific target which is obtained from a radar beam reflected from a special road-side reflector when the vehicle operates in a straight line path.

The above radar apparatus detects an error between a beam emission axis of a radar unit and a forward running path of the vehicle in a horizontal direction in accordance with the locus of the specific target. The beam emission axis of the radar unit is corrected by the above radar apparatus based on the detected error, so as to eliminate the error.

In the above radar apparatus, the error of the beam emission axis in the horizontal direction greatly varies depending on whether the vehicle operates in the center of a roadway lane or near the road side edge. In addition, the above radar apparatus tends to detect a road-side object such as a parked vehicle, other than the special road-side reflector, and detect the locus of such an unrelated object. Therefore, it is difficult for the above radar apparatus to provide an error of the beam emission axis in the horizontal direction with accuracy.

Further, a relative distance of the target detected by a radar apparatus has an error to a certain degree. In the above radar apparatus, an error of the beam emission axis in the horizontal direction is determined from the locus of a specific target obtained from a radar beam reflected from a special road-side reflector. Therefore, the error of the beam emission axis determined by the above radar apparatus becomes great due to the errors of the relative distance of the road-side reflector.

SUMMARY OF THE INVENTION

An object of the present invention is to provide an improved radar apparatus in which the above-described problems are eliminated.

Another object of the present invention is to provide a radar apparatus for use with an automotive vehicle which provides a correction value with accuracy for an error of a beam emission axis of a radar unit in a horizontal direction, the accuracy of the correction value being not influenced by variations of the forward running path of the vehicle or variations of the position of a road-side object, or errors of the relative distance of the target.

The above-mentioned objects of the present invention are achieved by a radar apparatus which includes a radar unit outputting signals at intervals of a predetermined time, each signal indicating data of a position of a target at an output time; a position detecting unit detecting data of the position of the target from each of the signals generated by the radar unit when an automotibe vehicle operates in a straight line path; and a correction value determining unit generating a set of errors of a beam emission axis to the straight line path of the vehicle with respect to a horizontal direction so that an average of the errors with respect to each of the signals is determined from the detected data from the position detecting unit, and determining a correction value by taking an average of the averages of the errors with respect to all the signals.

The above-mentioned objects of the present invention are achieved by a radar apparatus which includes: a radar unit outputting signals at intervals of a predetermined time, each signal indicating a scanned angle of a target as well as a relative distance of the target at an output time; a target detecting unit detecting the scanned angle and the relative distance of the target from each of the signals output by the radar unit when the target moves forward in a roadway lane different from a roadway lane of a vehicle or when the target is a fixed road-side object; and a correction value determining unit generating changes of the scanned angle and the relative distance of the target detected by the target detecting unit within a period from an initial output time to a final output time, and determining a correction value from the changes so that an error of a beam emission axis to a straight line path of the vehicle with respect to a horizontal direction is eliminated.

The radar apparatus of the present invention can provide a correction value with accuracy for the error of the beam emission axis of the radar unit in the horizontal direction. Errors of the correction value due to the variations of the position of a fixed object on a road side or due to the variations of the forward running path of the vehicle can be minimized according to the present invention. In addition, the time for the radar apparatus of the present invention to determine a correction value can be reduced with the accuracy of the correction value being maintained. The target detected by the radar apparatus of the present invention includes not only an advancing vehicle but also a road-side object, and it is possible to determine a correction value with respect to such a target.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 2:
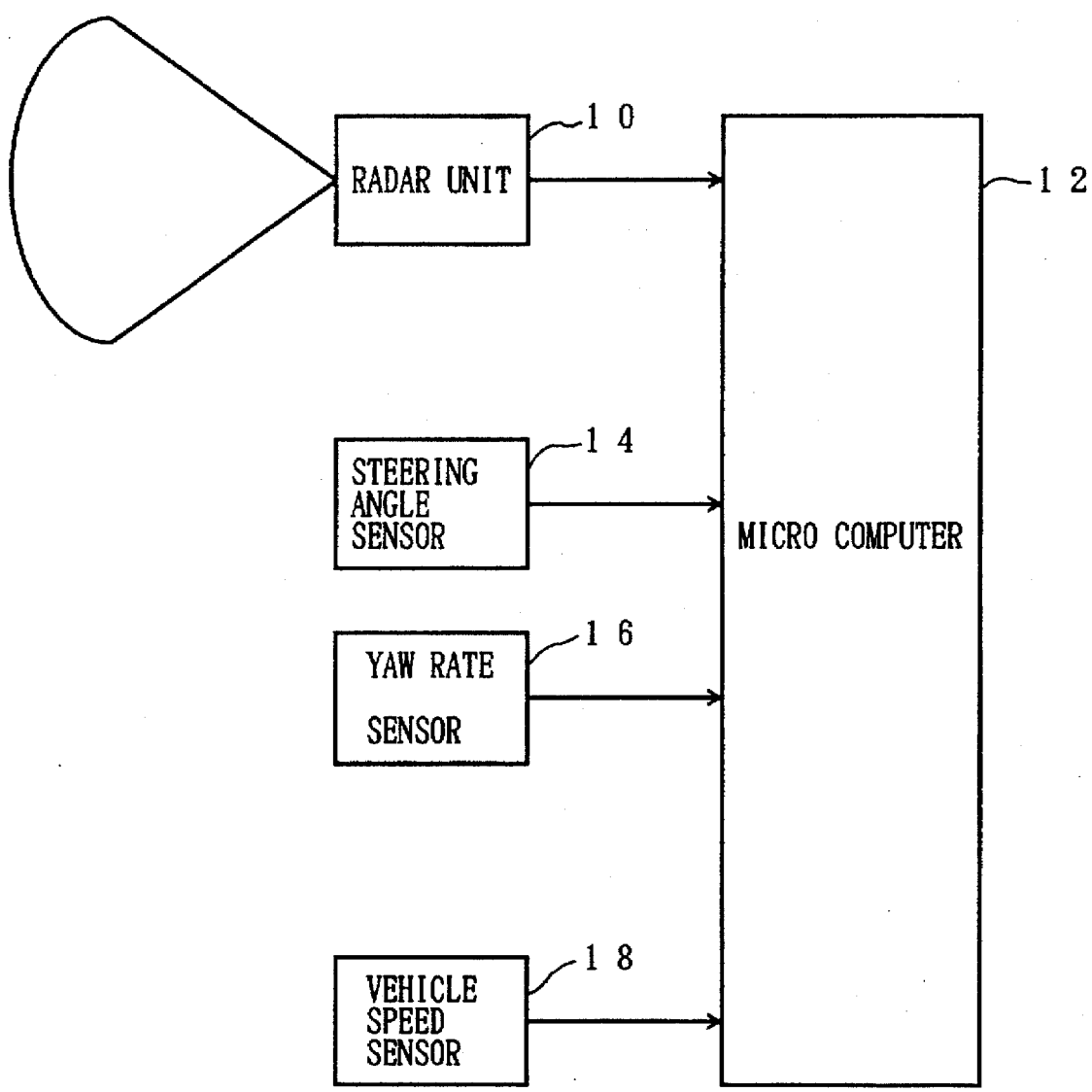
FIG. 2 is a block diagram of a radar apparatus to which an embodiment of the present invention is applied.

FIG. 2 shows a radar apparatus to which one embodiment of the present invention is applied. This radar apparatus is installed on an automotive vehicle.

Referring to FIG. 2, a radar unit 10 is a scanning type radar which transmits a radar beam to scan a distant object in a horizontal direction with respect to a beam emission axis of the radar unit 10. The radar unit 10 senses a relative distance between the scanned object and the vehicle by measuring the time for the radar beam to return to the radar unit 10 after the radar beam has been reflected off the object.

In the radar apparatus, a value of correction for an error between the beam emission axis of the radar unit 10 and a forward running path of the vehicle in the horizontal direction is determined, and the beam emission axis of the radar unit 10 is corrected in accordance with the value of correction.

The radar unit 10 senses a direction of the target, a relative velocity of the target, as well as the relative distance between the target and the subject vehicle. The radar unit 10 sends a detection signal, which is indicative of the direction of the target, the relative velocity of the target, and the relative distance of the target, to an input of a microcomputer 12.

The radar apparatus, shown in FIG. 2, includes a steering angle sensor 14, a yaw rate sensor 16, and a vehicle speed sensor 18. The steering angle sensor 14 senses a steering angle of the subject vehicle and sends a signal indicative of the steering angle to another input of the microcomputer 12. The yaw rate sensor 16 senses a yaw rate of the subject vehicle and sends a signal indicative of the yaw rate to a further input of the microcomputer 12. The vehicle speed sensor 18 senses a vehicle speed of the subject vehicle and sends a signal indicative of the vehicle speed to another input of the microcomputer 12.

Figure 3:
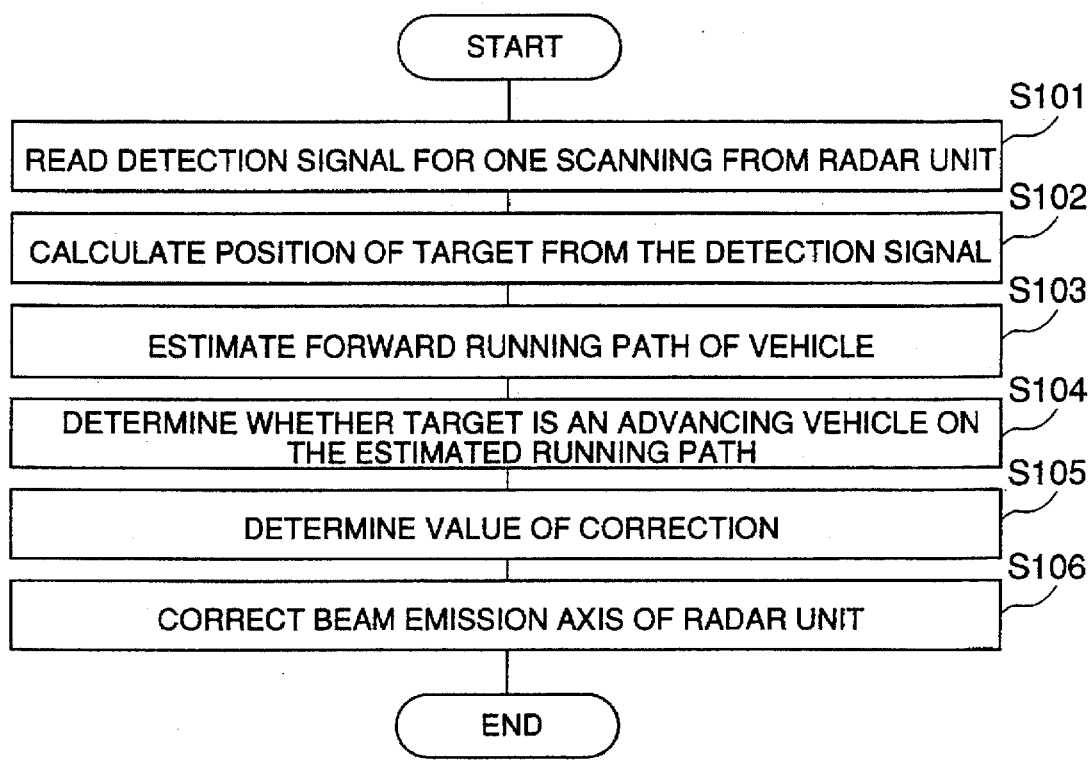
FIG. 3 is a flow chart for explaining a main procedure executed by a microcomputer of the radar apparatus in FIG. 2.

FIG. 3 shows a main procedure executed by the microcomputer 12 at intervals of a predetermined time. The time interval at which the main procedure is performed corresponds to a period of one scanning which is made by the radar beam from the radar unit 10.

It is supposed that, prior to the start of the main procedure in FIG. 3, the microcomputer 12 detects a neutral position of the steering angle in the subject vehicle from the average of the sensed steering angles during a predetermined period for which the subject vehicle operates on a straight line path (the yaw rate is zero).

Referring to FIG. 3, the microcomputer 12, at step S101, reads a detection signal from the radar unit 10 for one scanning which is presently made by the radar beam of the radar unit 10 over a target. Generally, reflectors for reflecting the radar beam are mounted at a right side rear end and a left side rear end of automotive vehicle. The radar unit 10 receives the radar beam reflected off each of the reflectors of the subject vehicle, and sends the detection signal to the microcomputer 12.

The microcomputer 12, at step S102, calculates a position of the target from the detection signal from the radar unit 10, the position of the target being defined by a set of coordinates (X, Y).

Figure 4:
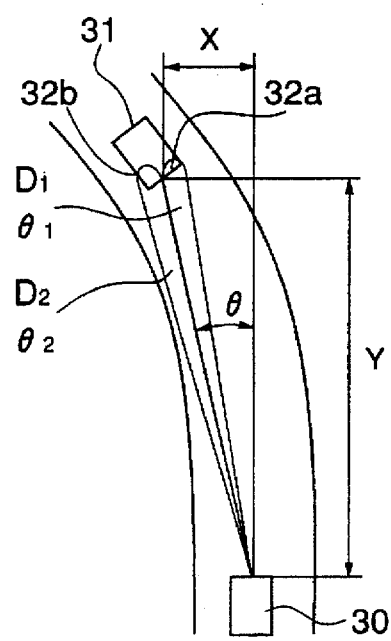
FIG. 4 is a diagram showing a coordinate system in which a position of a target is calculated, which is used in the main procedure of FIG. 3.

FIG. 4 shows a coordinate system in which the position of the target is calculated, the coordinate system being used in the main procedure of FIG. 3.

Referring to FIG. 4, an advancing vehicle 31 which operates forward in front of the subject vehicle 30 in the same roadway lane is a mobile target detected by the radar unit 10. In the advancing vehicle 31, reflectors 32a and 32b for reflecting the radar beam are mounted on the rear ends of the advancing vehicle 31. From the detection signal from the radar unit 10, the microcomputer 12 on the subject vehicle 30 can determine a relative velocity V1 of the reflector 32a, a relative distance D1 between the reflector 32a and the subject vehicle 30, a scanned angle Θ1 of the reflector 32a, a relative velocity V2 of the reflector 32b, a relative distance D2 between the reflector 32b and the subject vehicle 30, and a scanned angle Θ2 of the reflector 32b.

The relationships with respect to the positions of the reflectors 32a and 32b of the advancing vehicle 31 when the position of the radar apparatus of the subject vehicle 30 is taken as the origin of the coordinate system in FIG. 4 are defined by $$X1 = D1 \sin \Theta 1$$
$$Y1 = D1 \cos \Theta 1 \quad (1)$$
$$X2 = D2 \sin \Theta 2$$
$$Y2 = D2 \cos \Theta 2$$

In the coordinate system in FIG. 4, the forward running direction of the subject vehicle 30 is taken as the Y-axis, and the transversal direction perpendicular to the forward running direction of the subject vehicle 30 is taken as the X-axis.

The coordinates (X, Y) of the position of the advancing vehicle 31, and a vehicle width W of the advancing vehicle 31 are defined by $$X = (X1 + X2)/2$$
$$Y = (Y1 + Y2)/2 \quad (2)$$
$$W = |X1 - X2| \quad (3)$$

Accordingly, the coordinates (X, Y) of the position of the advancing vehicle 31 and the vehicle width W thereof are determined by the microcomputer 12 in accordance with the above Equations (1), (2) and (3).

Referring back to FIG. 3, the microcomputer 12, at step S103, estimates a forward running path of the subject vehicle 30 from the vehicle speed indicated by the signal from the vehicle speed sensor 18 and from the steering angle indicated by the signal from the steering angle sensor 14.

The microcomputer 12, at step S104, determines whether the target, whose position is defined by the above Equations (1) and (2), is an advancing vehicle on the estimated forward running path of the subject vehicle 30.

In order to determine that the target is the above-mentioned advancing vehicle, the microcomputer 12 detects whether the relative velocity of the target is substantially the same as the vehicle speed of the subject vehicle 30 indicated by the signal from the vehicle speed sensor 18. When the relative velocity of the target is detected as being the same as the vehicle speed, it is determined that the target is the above-mentioned advancing vehicle.

It is supposed that the relative velocity of the target is positive when the subject vehicle 30 approaches the target. Otherwise the relative velocity of the target is supposed to be negative.

The microcomputer 12, at step S105, calculates a value of correction for an error between the beam emission axis of the radar unit 10 and the forward running path of the subject vehicle 30 in the horizontal direction.

The microcomputer 12, at step S106, performs a correction of the beam emission axis of the radar unit 10 in accordance with the value of correction calculated at the step S105. After the step S106 is performed, the main procedure of FIG. 3 is finished.

Figure 5:
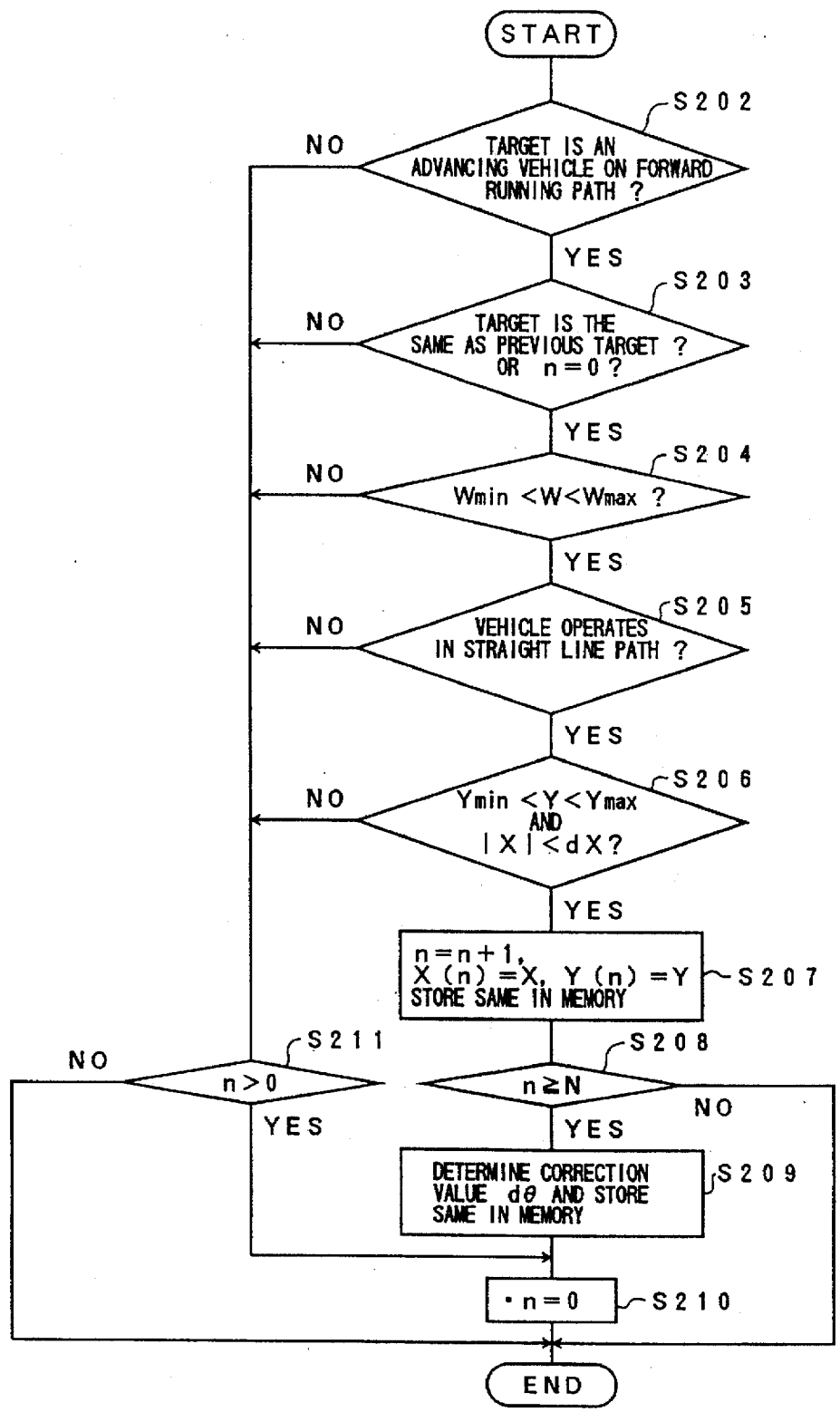
FIG. 5 is a flow chart for explaining a procedure to determine a correction value for an error of a beam emission axis in a horizontal direction, which is performed in one embodiment of the present invention.

FIG. 5 shows a procedure to determine a value of correction for an error between the beam emission axis of the radar unit 10 and the forward running path of the subject vehicle 30 in the horizontal direction. This procedure is performed by the microcomputer 12 in one embodiment of the present invention.

Referring to FIG. 5, step S202 detects whether the target is an advancing vehicle on the estimated forward running path of the subject vehicle 30, from the detection signal from the radar unit 10.

If the result at the step S202 is affirmative, step S203 is performed by the microcomputer 12. If the result at the step S202 is negative, step S211 is performed by the microcomputer 12.

Step S203 detects whether the advancing vehicle detected at a present output time is the same as the advancing vehicle previously detected at a previous output time.

The microcomputer 12 estimates a position of the presently detected advancing vehicle from the position of the previously detected advancing vehicle and from the relative velocity thereof. When the presently detected advancing vehicle lies within a predetermined range around the center of the estimated position, it is determined that the presently detected advancing vehicle is the same as the previously detected advancing vehicle.

Also, step S203 detects whether a count value "n" is equal to 0 (zero). The count value "n" indicates the number of determinations of the average of the errors related to the beam emission axis of the radar unit 10, which will be described later. Thus, n=0 means that the average of the errors is not determined.

If the result at the step S203 is affirmative (the presently detected vehicle is the same as the previously detected vehicle, or n=0), step S204 is performed by the microcomputer 12. If the result at the step S203 is negative, step S211 is performed by the microcomputer 12.

Step S204 detects whether the vehicle width W, calculated at the step S102, is greater than a minimum vehicle width "Wmin" and smaller than a maximum vehicle width "Wmax".

Figure 6A:
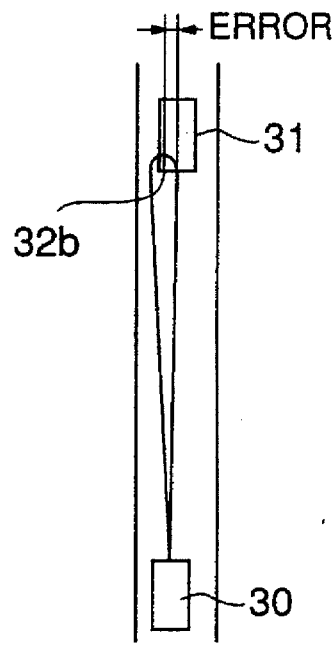
FIGS. 6A and 6B are diagrams for explaining a step of the procedure to determine the correction value in FIG. 5.
Figure 6B:
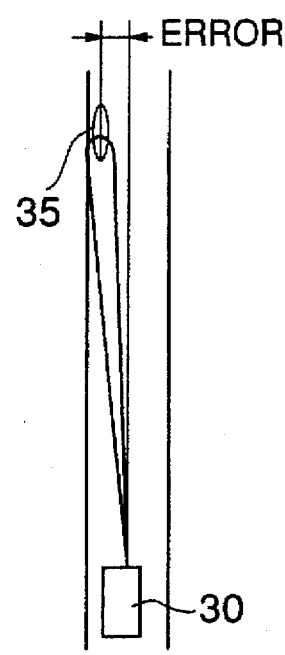

When the vehicle width W is below the minimum vehicle width Wmin (for example, 1 m), it is conceivable that the target detected by the radar unit 10 is either a single reflector 32b of the advancing vehicle 31 or a motorcycle (or a bicycle) 35. The former case is shown in FIG. 6A, and the latter case is shown in FIG. 6B. In FIG. 6B, the motorcycle 35 runs forward in front of the subject vehicle 30 in the same roadway lane. In these cases, the coordinates (X, Y) of the position of the target greatly deviates from the forward running path of the subject vehicle 30, and an error of the correction value determined by the radar apparatus becomes great. Therefore, the determination of a correction value for an error of the beam emission axis in these cases is inhibited.

Figure 7A:
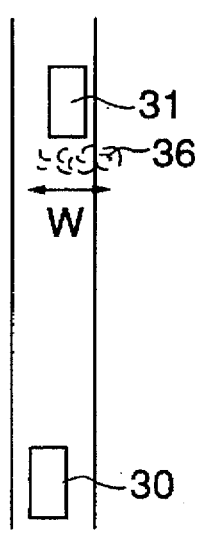
FIGS. 7A and 7B are diagrams for explaining a step of the procedure to determine the correction value in FIG. 5.
Figure 7B:
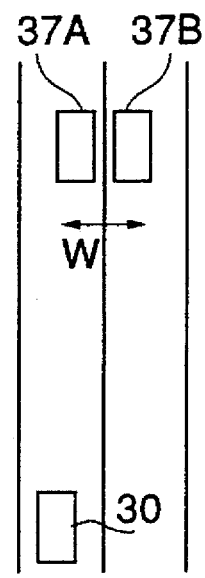

When the vehicle width W is above the maximum width Wmax, it is conceivable that the target detected by the radar unit 10 is either a mist 36 from the advancing vehicle 31 or two advancing vehicles 37A and 37B running in parallel at the same vehicle speed in the roadway lanes. The former case is shown in FIG. 7A, and the latter case is shown in FIG. 7B. In these cases, the coordinates (X, Y) of the position of the target greatly deviates from the forward running path of the subject vehicle 30, and an error of the correction value determined by the radar apparatus becomes great. Therefore, the determination of a correction value for an error of the beam emission axis in these cases is inhibited.

Accordingly, if the result at the step S204 is affirmative (Wmin<W<Wmax), step S205 is performed by the microcomputer 12. If the result at the step S204 is negative, step S211 is performed by the microcomputer 12.

Step S205 detects whether the subject vehicle 30 operates in a straight line path. The microcomputer 12 determines a radius of curvature of the road from the sensed vehicle speed from the vehicle speed sensor 18 and the sensed steering angle from the steering angle sensor 14. When the absolute value of the reciprocal of the radius of curvature of the road is below a predetermined value, or when the absolute value of the sensed steering angle is below a predetermined value, or when the absolute value of the sensed yaw rate is below a predetermined value, it is determined that the subject vehicle 30 operates in a straight line path.

If the result at the step S205 is affirmative, step S206 is performed by the microcomputer 12. If the result at the step S205 is negative, step S211 is performed by the microcomputer 12.

Step S206 detects whether the coordinates (X, Y) of the position of the advancing vehicle 31 on the forward running path of the subject vehicle 30 meet the requirements: Ymin<Y<Ymax, |X|<dX where Ymin is a predetermined minimum relative distance Ymin, Ymax is a predetermined maximum relative distance, and dX is a predetermined maximum transverse distance.

Figure 8A:
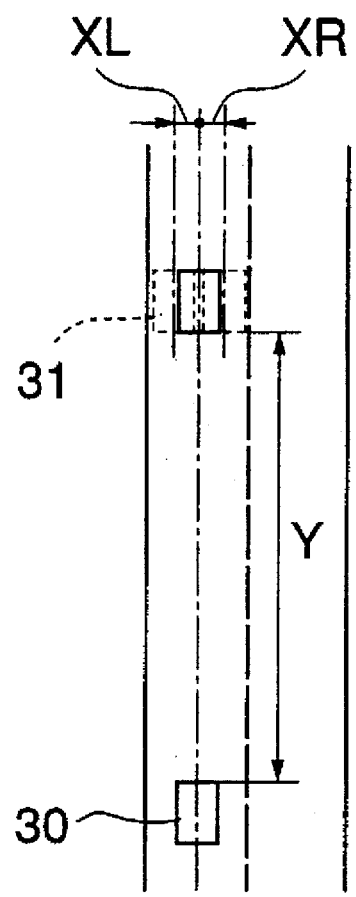
FIGS. 8A and 8B are diagrams for explaining a step of the procedure to determine the correction value in FIG. 5.
Figure 8B:
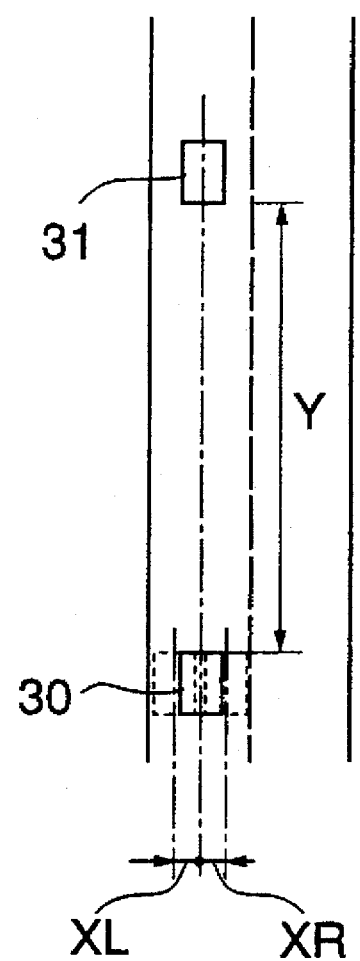

When Y≦Ymin, the relative distance between the advancing vehicle 31 and the subject vehicle 30 is too small. Even when the subject vehicle 30 operates in the center of a roadway lane, as shown in FIG. 8A, the detected position (X) of the advancing vehicle 31 greatly deviates from the forward running path of the subject vehicle 30 if the advancing vehicle 31 operates near the right side edge of the roadway lane or the left side edge thereof. In addition, even when the advancing vehicle 31 operates in the center of a roadway lane, as shown in FIG. 8B, the detected position (X) of the advancing vehicle 31 greatly deviates from the forward running path of the subject vehicle 30 if the vehicle 30 operates near the right side edge of the roadway lane or the left side edge thereof. Therefore, an error of the correction value determined by the radar apparatus in these cases becomes great, and the determination of a correction value in these cases is inhibited.

In FIGS. 8A and 8B, XL indicates the error of the detected position (X) of the advancing vehicle 31 when the advancing vehicle 31 or the subject vehicle 30 operates near the left side edge of the roadway lane, and XR indicates the error of the detected position (X) of the advancing vehicle 31 when the advancing vehicle 31 or the subject vehicle 30 operates near the right side edge of the roadway lane.

When Y≧Ymax, the relative distance between the advancing vehicle 31 and the subject vehicle 30 is too great. It is difficult to continuously detect the advancing vehicle 31. Therefore, the determination of a correction value in this case is inhibited.

When |X|≧dX, it is determined that the advancing vehicle 31 operates in a curved path, not in a straight line path.

If the result at the step S206 is affirmative, step S207 is performed by the microcomputer 12. If the result at the step S206 is negative, step S211 is performed by the microcomputer 12.

Step S207 increments the count value "n" (n=n+1) and stores the values of the coordinates (X, Y) of the position of the advancing vehicle 31 for the present count value "n" in a memory of the microcomputer 12. The values of the coordinates X(n) and Y(n) are stored in the memory of the microcomputer 12.

Step S208 detects whether the count value "n" is equal to or greater than a reference value "N". The reference value N is used to calculate the average of "N" errors of the beam emission axis in the horizontal direction with respect to the same target, or the advancing vehicle 31. Each of the "N" errors is determined as the angle from the values of the coordinates (X, Y) of the position of the advancing vehicle 31 relative to the subject vehicle 30.

If the result at the step S208 is affirmative (n≧N), step S209 is performed by the microcomputer 12. If the result at the step S208 is negative (n<N), the procedure of FIG. 5 ends and the procedure is repeated from the start.

Step S209 determines the "N" errors $d\Theta_{(k)}$ of the beam emission axis in the horizontal direction (k=1 through N) and the average $d\Theta_{av}$ of the "N" errors in accordance with the following equations, and stores them in the memory of the microcomputer 12.

$$d\Theta_{(k)} = \tan^{-1}(X(k)/Y(k)) \qquad (4)$$

$$d\Theta_{av} = \sum_{k=1}^{N} d\Theta_{(k)}/N \qquad (5)$$

Step S209 determines a correction value dΘ in accordance with the following equations by using values of "l" averages $d\Theta_{av}$. The "l" averages are $d\Theta_{av1}$ through $d\Theta_{avl}$ averages of the errors with respect to "l" counterparts of the advancing vehicle 31 including the newest one.

$$d\Theta = (d\Theta_{av1} + \ldots + d\Theta_{avl})/l \qquad (6)$$

Further, step S209 stores the correction value dΘ in the memory of the microcomputer 12.

After the step S209 is performed, step S210 resets the count value "n" to 0 (zero). And after the step S210 is performed, the procedure of FIG. 5 ends.

Step S211 detects whether the count value "n" is greater than zero (n>0). If the result at the step S211 is negative (n≦0), the step S210 is not performed and the procedure of FIG. 5 ends. If the result at the step S211 is affirmative (n>0), the step S210 is performed and the procedure of FIG. 5 ends.

Accordingly, in the present embodiment, when the "N" errors of the beam emission axis in the horizontal direction for the same advancing vehicle 31 are sequentially obtained, the average $d\Theta_{av}$ of the "N" errors is determined in accordance with the Equations (4) and (5).

In addition, in the present embodiment, the correction value dΘ is determined in accordance with the Equation (6) by using the averages $d\Theta_{av1}$ through $d\Theta_{avl}$ of the errors with respect to the "l" counterparts of the advancing vehicle 31.

If the correction value dΘ is determined by using only one average $d\Theta_{av}$, an error of the correction value becomes great depending on the tendency of deviating operation of the subject vehicle 30 by a vehicle operator.

In addition, the present embodiment may be modified such that the correction value dΘ is determined by using a small number of the averages of the errors with respect to the presently obtained counterparts of the advancing vehicle 31 when a total of the "l" averages $d\Theta_{av1}$ through $d\Theta_{avl}$ of the errors with respect to the "l" counterparts of the advancing vehicle 31 are not yet determined.

In the above embodiment, it is necessary to determine the correction value by using the "l" averages of the errors with respect to the "l" counterparts of the advancing vehicle 31. The target detected by the radar apparatus is limited to the advancing vehicle 31. A relatively long time is needed to determine the correction value in this embodiment.

Figure 9A:
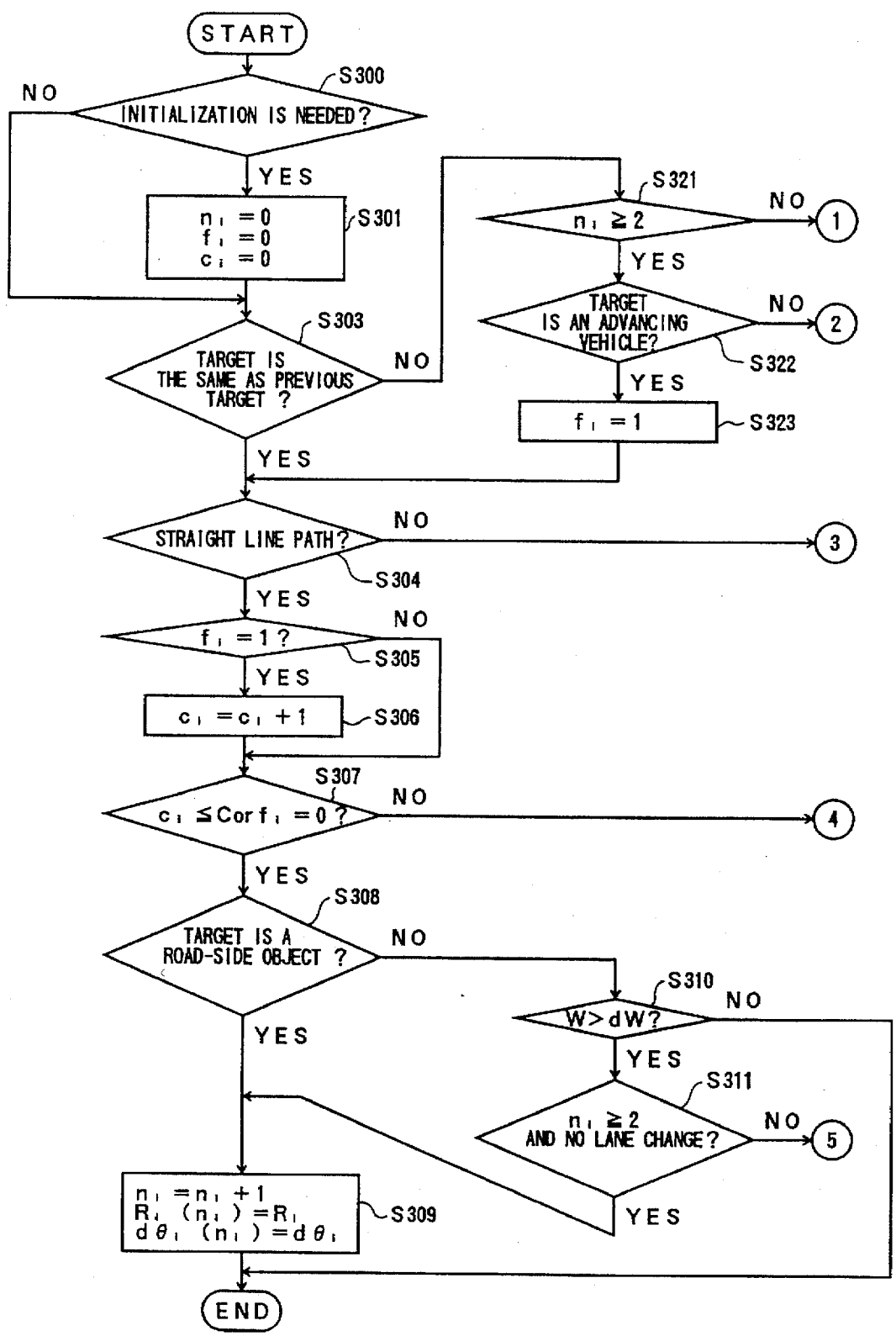
FIGS. 9A and 9B are a flow chart for explaining a procedure to determine a correction value for an error of a beam emission axis in a horizontal direction, which is performed in another embodiment of the present invention.
Figure 9B:
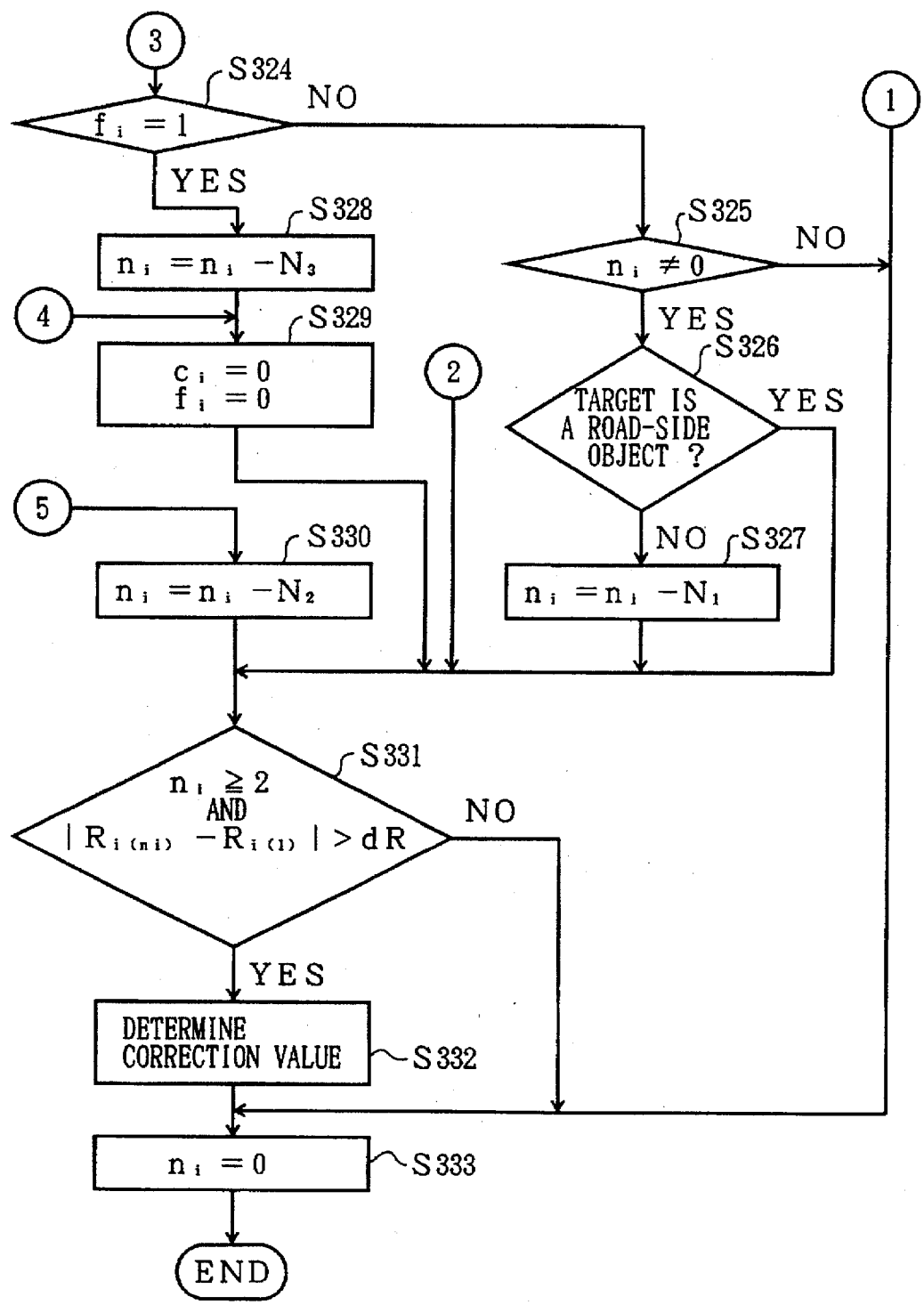

FIGS. 9A and 9B shows a procedure to determine a value of correction for an error of the beam emission axis in the horizontal direction, which is performed by the microcomputer 12 in another embodiment of the present invention. An object of this embodiment is to resolve the above-mentioned problem of the previous embodiment of FIG. 5.

Similarly to the previous embodiment of FIG. 5, the main procedure of FIG. 3 is executed by the microcomputer 12 in this embodiment at the intervals of the predetermined time. The procedure of FIGS. 9A and 9B corresponds to the step S105 of the main procedure of FIG. 3.

Figure 10:
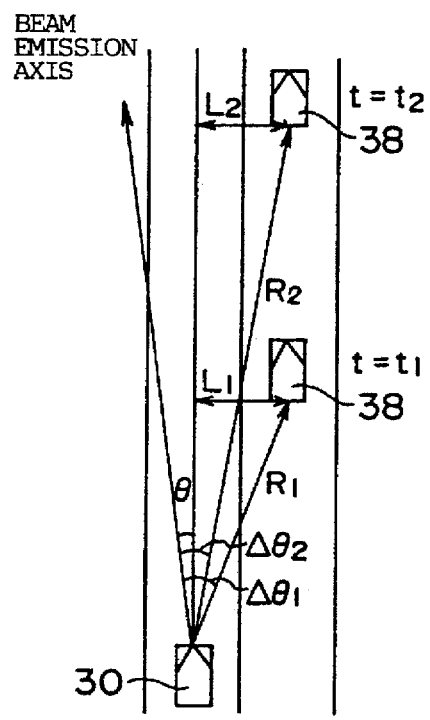
FIG. 10 is a diagram showing a coordinate system for explaining a procedure to determine a position of a target, which is used by the embodiment of FIGS. 9A and 9B.
Figure 11:
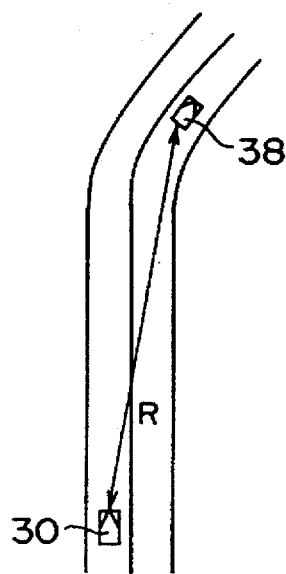
FIGS. 11, 12 13, and 14 are diagrams for explaining steps of the procedure to determine the correction value in FIGS. 9A and 9B.

FIG. 10 shows a coordinate system in which the position is target is calculated, the coordinate system being used in the procedure of FIGS. 9A and 9B.

Referring to FIG. 10, an advancing vehicle 38 which operates forward in a second roadway lane different from a first roadway lane in which the subject vehicle 30 operates is a mobile target detected by the radar unit 10. A relative distance R1 of the advancing vehicle 38 and a scanned angle $d\Theta_1$ thereof are detected by the microcomputer 12 of the vehicle 30 from a detection signal outputted by the radar unit 10 at an initial output time t1. A relative distance R2 of the advancing vehicle 38 and a scanned angle $d\Theta_2$ thereof are detected by the microcomputer 12 from a detection signal outputted by the radar unit 10 at a final output time t2.

An error between the beam emission axis of the radar unit 10 and the forward running path of the vehicle 30 in the horizontal direction in the present embodiment is indicated by e. In FIG. 10, traverse distances L1 and L2 between the advancing vehicle 38 and the subject vehicle 30 with respect to the positions of the advancing vehicle 38 at the initial and final output times t1 and t2 are defined by $$L1 = R1 \sin(d\Theta_1 - \Theta) \qquad (7)$$

$$L2 = R2 \sin(d\Theta_2 - \Theta) \qquad (8)$$

When the subject vehicle 30 operates in a straight line path, the transverse distance L1 is nearly equal to the transverse distance L2. Accordingly, from the above Equations (7) and (8), $$R1 \sin(d\Theta_1 - \Theta) = R2 \sin(d\Theta_2 - \Theta)$$

From this equation, a correction value Θ for the error of the beam emission axis in the horizontal direction can be obtained as follows.

$$\Theta = \tan^{-1}[(R1 \sin d\Theta_1 - R2 \sin d\Theta_2)/(R1 \cos d\Theta_1 - R2 \cos d\Theta_2)] \qquad (9)$$

Generally, when the scanned angle $d\Theta_1$, the scanned angle $d\Theta_2$, and the error Θ are small enough, the approximations: $\sin d\Theta_1 = d\Theta_1$, $\sin d\Theta_2 = d\Theta_2$, $\cos d\Theta_1 = \cos d\Theta_2 = 1$, $\tan \Theta = \Theta$ may be made.

Accordingly, by using the approximations, the above Equation (9) can be rewritten as follows.

$$\Theta = (R1\, d\Theta_1 - R2\, d\Theta_2)/(R1-R2) \quad (10)$$

Therefore, the error $\Theta$ of the beam emission axis in the horizontal direction can be determined by the microcomputer 12 in this embodiment in accordance with the Equation (9) or the Equation (10).

Referring to FIGS. 9A and 9B, step S300 detects whether an initialization of count values is needed. When the procedure of FIGS. 9A and 9B is performed for the first time, this initialization is needed. If the result at the step S300 is affirmative, step S301 is performed. If the result at the step S300 is negative, step S303 is performed and the step S301 is no longer performed.

Step S301 resets all the count values to zero, the count values including a detection count value "ni" of each target, a failure count value "fi" of the target, and a failure scanning count value "ci" of the target. The suffix "i" of the count values is used to indicate a specific one of the targets detected by the radar unit 10. After the step S301 is performed, step S303 is performed.

Step S303 detects whether the target (i) detected at the present output time is the same as the target (i) previously detected at the previous output time. This step S303 is similar to the step S203 of the previous procedure of FIG. 5.

The subsequent steps are performed for each of the targets detected by the radar unit 10. Hereinafter, a specific one of the targets detected is called the target (i). If the result at the step S303 is affirmative, step S304 is performed. If the result at the step S303 is negative, step S321 of FIG. 9B is performed, which will be described later.

Step S304 detects whether the subject vehicle 30 operates in a straight line path. This step S304 is similar to the step S205 of the previous procedure of FIG. 5. If the result at the step S304 is affirmative, step S305 is performed. If the result at the step S304 is negative, step S324 of FIG. 9B is performed, which will be described later.

Step S305 detects whether the failure count value "fi" is equal to 1 (one). "fi"=1 indicates a failure of the detection of the target (i). Thus, if the result at the step S305 is affirmative, step S306 is performed. Step S306 increments the failure scanning count value ci (ci=ci+1). After the step S306 is performed, step S307 is performed.

The failure count value "fi"=0 means that the detection of the target is not failed. Thus, if the result at the step S305 is negative, step S307 is performed and the step S306 is not performed.

Step S307 detects whether the failure scanning count value "ci" is below a threshold value C or whether the failure count value "fi" is equal to zero.

Generally, the threshold value C is defined by the equation: $C=(R/V) \cdot Sc$ where R is a relative distance of the target detected before the target is not found by the microcomputer 12 of the vehicle 30, V is a sensed vehicle speed of the vehicle 30, and Sc is a rate of scanning of the radar unit 10 (or the number of scannings per unit time).

When a simplified procedure is desired, a constant value may be instead used as the threshold value C.

If the result at the step S307 is affirmative (ci≦C or fi=0), it is determined that the target (the advancing vehicle 38) is continuously detected by the radar unit 10 or the vehicle 30 approaches a position of the advancing vehicle 38 at which the vehicle 38 is not found by the microcomputer 12. In this case, step S308 is performed by the microcomputer 12.

If the result at the step S307 is negative, step S329 of FIG. 9B is performed, which will be described later.

Step S308 detects whether the target (i) is a road-side object. When the relative velocity (which is a derivative of the relative distance) of the target (i) is almost the same as the vehicle speed of the subject vehicle 30, it is determined that the target (i) is a vehicle (or the advancing vehicle 38). Otherwise it is determined that the target (i) is a road-side object. If the result at the step S308 is affirmative (the road-side object), step S309 is performed.

Step S309 increments the detection count value ni (ni=ni+1), stores a relative distance $R_i$ of the target (i) detected at the final output time at a location $R_{i(ni)}$ of the memory of the microcomputer 12 for the detection count value ni, and stores a scanned angle $d\Theta_i$ of the target (i) detected for the final output time at a location $d\Theta_{i(ni)}$ of the memory of the microcomputer 12 for the detection count value ni.

If the result at the step S308 is negative (the advancing vehicle), step S310 is performed.

Step S310 detects whether the vehicle width W of the target (i) is above a predetermined width dW (which is, for example, 1 m). When W>dW, it is determined that the target (i) is a four-wheel vehicle. Step S311 is performed. When W≦dW, it is determined that the target (i) is a motorcycle. In this case, the determination of a correction value for an error of the beam emission axis is inhibited. Step S330 of FIG. 9B is performed, which will be described later.

After the step S310 is performed, step S311 detects whether the detection count value ni is above 2 and the target (i) makes no roadway lane change. When the difference (the absolute value) between a transverse distance ($l_i$ $=R_{i(ni)}$ sin $d\Theta_{i(ni)}$) of the vehicle 38 detected at the final output time and a transverse distance $l_1$ ($=R_{i(l)}$ sin $d\Theta_{i(l)}$) of the vehicle 38 detected at the initial output time is smaller than a predetermined value dl, it is determined that the target (i) makes no roadway lane change. This requirement is defined by $$|R_{i(ni)} \sin d\Theta_{i(ni)} - R_{i(l)} \sin d\Theta_{i(l)}| < dl.$$

Figure 12:
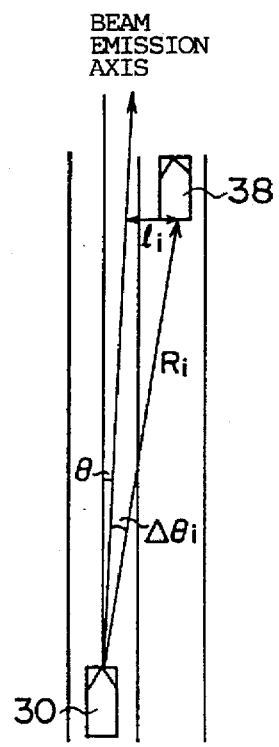

The transverse distance $l_i$ ($=R_{i(ni)}$ sin $d\Theta_{i(ni)}$) of the vehicle 38 is shown in FIG. 12. The predetermined value dl is a value that is nearly equal to a width of the roadway lane.

If the result at the step S311 is affirmative, it is determined that the target (i) which is the advancing vehicle 38 is suitable for the determination of a correction value for an error of the beam emission axis. In this case, the step S309 is performed.

Figure 13:
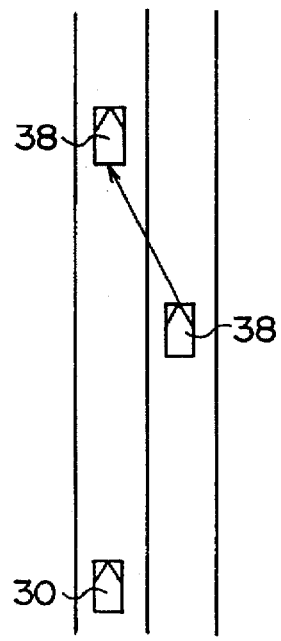

When the target (i) which is the advancing vehicle 38 makes a roadway lane change, as shown in FIG. 13, or when the detection count value ni<2, the result at the step S311 is negative. It is determined that the target (i) is not suitable for the determination of a correction value for an error of the beam emission axis. In this case, step S330 of FIG. 9B is performed.

Step S330 subtracts a value N2 from the detection count value ni (ni=ni−N2) so as to avoid the determination of a correction value for an error of the beam emission axis related to the advancing vehicle 38. The value N2 is a value corresponding to the number of scannings for a period during which the roadway lane change is made by the advancing vehicle 38.

In the step S330, providing the scanned angle and the relative distance of the target for the determination of a correction value is inhibited during a predetermined period prior to occurrence of the roadway lane change when the advancing vehicle 38 which moves forward in the different roadway lane has made the roadway lane change.

As previously described, if the result at the step S303 of FIG. 9A is negative, step S321 is performed. Step S321 detects whether the detection count value ni is above 2. If the result at the step S321 is negative (ni< 2), step S333 of FIG. 9B is performed. Step S333 resets the detection count value ni to zero, and the procedure of FIGS. 9A and 9B ends.

If the result at the step S321 is affirmative (ni≧2), step S322 is performed. Step S322 detects whether the target (i) is an advancing vehicle.

If the result at the step S322 is affirmative, it is determined that the target (i) is an advancing vehicle, and step S323 is performed. Step S323 sets the failure count value "fi" to 1, which indicates a failure of the detection of the target (i). After the step S323 is performed, the step S304 is performed.

If the result at the step S322 is negative, it is determined that the target (i) is not an advancing vehicle. Step S331 of FIG. 9B is performed, which will be described later.

As previously described, if the result at the step S304 is negative, it is determined that the subject vehicle 30 operates in a curved path, and step S324 of FIG. 9B is performed. Step S324 detects whether the failure count value fi of the target (i) is equal to 1.

If the result at the step S324 is affirmative (fi=1), it is determined that the detection of the target (i) is failed and thereafter the vehicle 30 enters the curved path. In this case, step S328 is performed, which will be described later.

If the result at the step S324 is negative (fi=0), it is determined that the detection of the target (i) is not failed and the vehicle 30 enters the curved path. In this case, step S325 is performed.

Step S325 detects whether the detection count value ni is not equal to 0 (zero). If ni=0, the step S333 is performed. If ni is not equal to 0, step S326 is performed.

Step S326 detects whether the target (i) is a road-side object. If the target (i) is not a road-side object but an advancing vehicle, step S327 is performed. Step S327 subtracts a value N1 from the detection count value ni (ni=ni−N1). After the detection count value ni is updated, step S331 is performed.

If the target (i) is a road-side object at the step S326, the step S331 is performed and the S327 is not performed.

Figure 14:
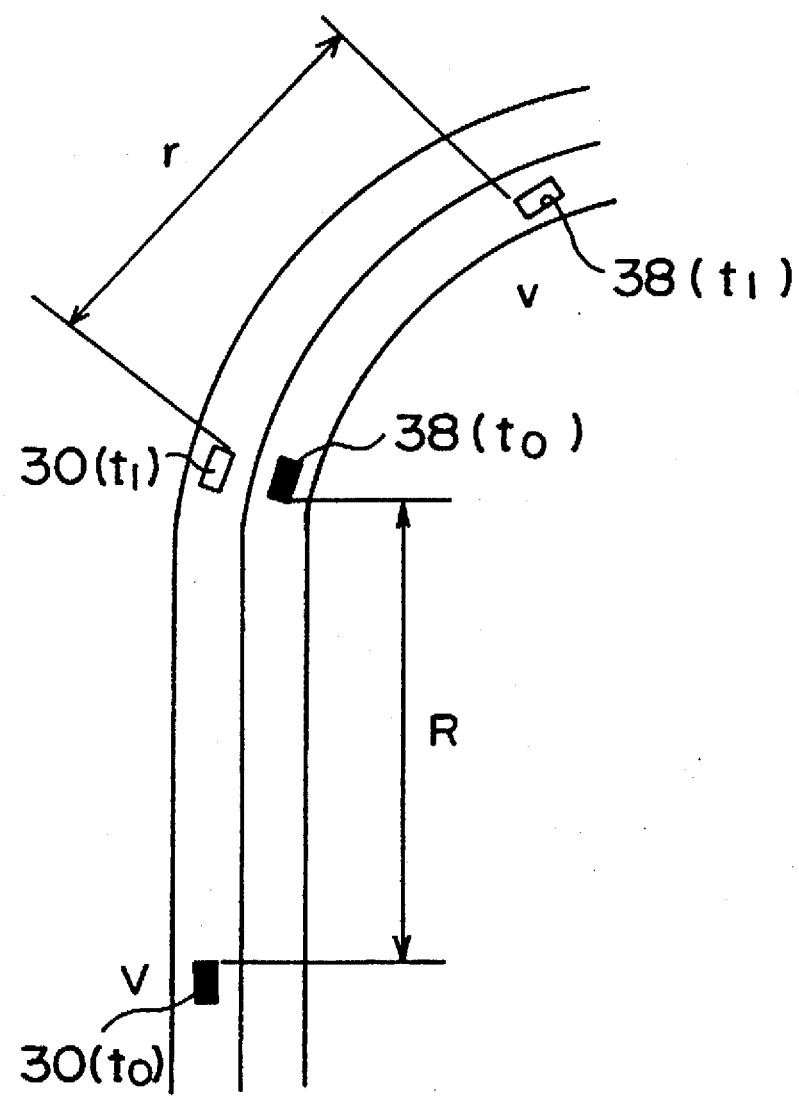

FIG. 14 is a diagram for explaining the procedure to determine a correction value when the vehicle 30 operates in the curved path. Referring to FIG. 14, the advancing vehicle 38 enters the curved path at the initial output time t0, and thereafter the vehicle 30 enters the curved path at the final output time t1.

In the example of FIG. 14, the following equations are obtained with respect to a relative distance R of the target 38 at t0, a vehicle speed V of the vehicle 30 at t0, a relative distance r of the target 38 at t1, and a relative velocity v of the target 38 at t1.

$$r - R = R \cdot t$$
$$R = V/t$$

From the equations, a period t (=t1−t0) is defined by the equation: t=r/(V+v).

In this example, the target (i) which is detected during the period t is the advancing vehicle 38 which already entered the curved path. This target (i) is not suitable for the determination of a correction value for an error of the beam emission axis.

Therefore, at the above step S327, the value N1 is subtracted from the detection count value ni. The value N1 is a value corresponding to the number of scannings during the above period t. The value N1 is defined by the equation N1=t·Sc where Sc is the rate of scanning of the radar unit 10 (or the number of scannings per unit time). When a simplified procedure is desired, a constant value may be instead used as the value N1. Providing the scanned angle and the relative distance of the target (i) for the determination of a correction value is inhibited during the period t.

As previously described, if the result at the step S324 is affirmative, step S328 is performed. Step S328 subtracts a value N3 from the detection count value ni (ni=ni−N3). The value N3 is a value corresponding to the number of scannings from a time the detection of the target (i) is failed to a time the vehicle 30 enters the curved path. When a simplified procedure is desired, a constant value may be instead used as the value N3.

The steps S327 and S328 are performed when the subject vehicle 30 operates in a curved path. In these steps, providing the scanned angle and the relative distance of the target for the determination of a correction value is inhibited from the time t0 the advancing vehicle 38, moving forward in the different roadway lane, enters the curved path to the time t1 the subject vehicle 30 enters the curved path.

After the step S328 is performed, step S329 is performed. Alternatively, if the result at the step S307 is negative (fi=1 and ci>C), step S329 is performed. Step S329 resets the failure count value fi to zero and resets the failure count value ci to zero. When the detection of the target (i) is failed and thereafter the vehicle 30 continues to operate in a straight line path, not enter the curved path, the above step S329 is performed. After the step S329 is performed, step S331 is performed.

Step S331 detects whether the detection count value ni is above 2 and whether the difference between the relative distance $R_{i(ni)}$ of the target (i) detected at the final output time and the relative distance $R_{i(I)}$ of the target (i) detected at the initial output time is greater than a predetermined value dR. If ni≧2 and $|R_{i(ni)}-R_{i(I)}|>dR$, step S332 is performed to determine a correction value.

If the difference $|R_{i(ni)}-R_{i(I)}|$ is below the predetermined value dR, a difference between the scanned angle $d\Theta_{i(ni)}$ and the scanned angle $d\Theta_{i(I)}$ becomes too small and an error of the correction value determined at step S332 becomes too great. Therefore, if the result at the step S331 is negative, the step S332 is not performed and step S333 is performed.

Step S332 determines a correction value Θ in accordance with the following equation.

$$\Theta=\tan^{-1}[(R_{i(I)} \sin d\Theta_{i(I)}-R_{i(ni)} \sin d\Theta_{i(ni)})/(R_{i(I)} \cos d\Theta_{i(I)}-R_{i(ni)} \cos d\Theta_{i(ni)})] \quad (11)$$

This Equation (11) is derived from the Equation (9). After the step S332 is performed, step S333 resets the detection count value ni to 0 (zero). The procedure of FIGS. 9A and 9B ends.

In the present embodiment, the correction value can be determined from changes of the scanned angle and the relative distance of the target from the initial output time to the final output time. Statistical calculations such as in the embodiment of FIG. 5 are not needed, and the accuracy of the correction value is not influenced by the variations of the forward running path of the subject vehicle or the variations of the position of the target.

Accordingly, the time for the radar apparatus in the present embodiment to determine a correction value can be reduced with the accuracy of the correction value being maintained. The target detected by the radar apparatus of the present embodiment includes not only an advancing vehicle but also a road-side object, and the radar apparatus in the present embodiment can determine a correction value with respect to such a target.

In addition, in the present embodiment, when the advancing vehicle which is the target detected makes a roadway lane change, providing the data of the scanned angle and the relative distance of the target to the determination of the correction value is inhibited during the period of the roadway lane change (step S330). Therefore, it is possible to prevent the correction value from greatly deviating from the exact error of the beam emission axis of the radar unit in the horizontal direction due to the roadway lane change of an advancing vehicle. The radar apparatus in the present embodiment can provide a correction value with accuracy.

In addition, in the present embodiment, when the vehicle operates in a curved path, providing the data of the scanned angle and the relative distance of the target to the determination of the correction value is inhibited during a period from the time the target enters the curved path to the time the vehicle enters the curved path (steps S327, S328). Therefore, it is possible to prevent the correction value from greatly deviating from the exact error of the beam emission axis of the radar unit in the horizontal direction due to the entry of the vehicle to the curved path. The radar apparatus in the present embodiment can provide a correction value with accuracy.

Figure 1A:
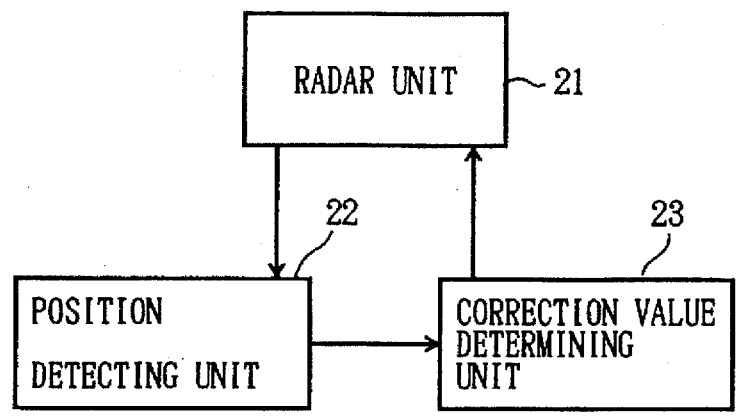
FIGS. 1A and 1B are block diagrams showing the aspects of the present invention.

FIG. 1A shows one aspect of the present invention which will be readily understood from the above-described embodiments. Referring to FIG. 1A, a radar apparatus of an automotive vehicle in this aspect corrects a beam emission axis in accordance with a value of correction to eliminate an error of the beam emission axis in a horizontal direction when the vehicle operates in a straight line path.

The radar apparatus, shown in FIG. 1A, includes a radar unit 21 which outputs signals at intervals of a predetermined time, each signal indicating data of a position of a target at an output time. A position detecting unit 22 detects data of the position of the target from each of the signals output by the radar unit 21 when the vehicle operates in a straight line path. A correction value determining unit 23 generates a set of errors of the beam emission axis to the straight line path of the vehicle with respect to the horizontal direction so that an average of the errors with respect to each of the signals is determined from the detected data from the position detecting unit 22, the correction value determining unit 23 thereby determining a correction value by taking an average of the averages of the errors with respect to all the signals.

Figure 1B:
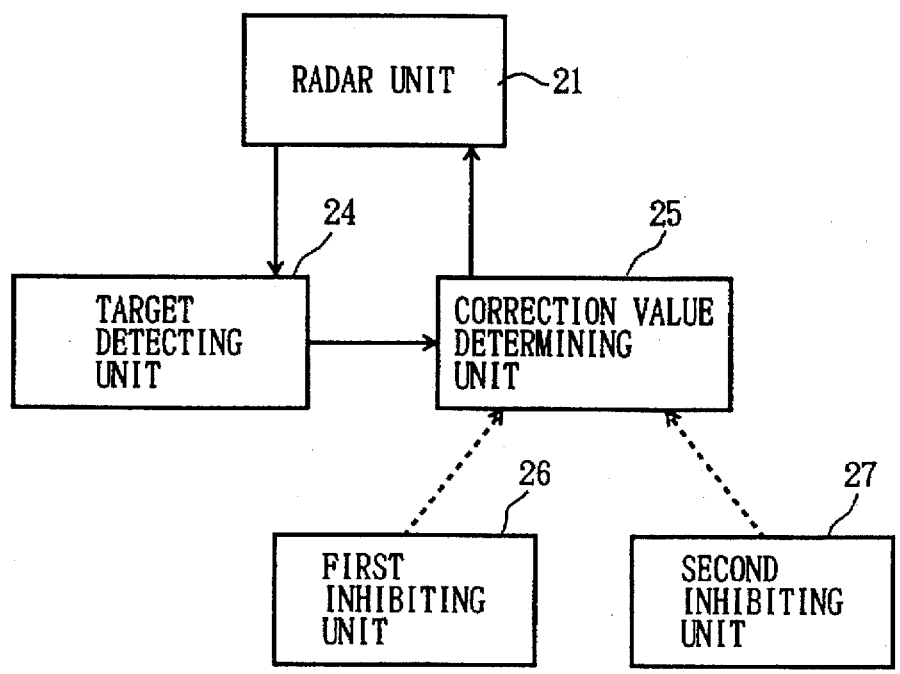

FIG. 1B shows another aspect of the present invention which will be readily understood from the above-described embodiments. Referring to FIG. 1B, the radar unit 21, similarly to the radar unit 21 in FIG. 1A, outputs signals at intervals of a predetermined time, each signal indicating a scanned angle of a target and a relative distance of the target at an output time.

A target detecting unit 24 detects the scanned angle and the relative distance of the target from each of the signals output by the radar unit 21 when the target moves forward in a roadway lane different from a roadway lane of the vehicle or when the target is a fixed road-side object. A correction value determining unit 25 determines changes of the scanned angle and the relative distance of the target detected by the target detecting unit 24 from an initial output time to a final output time, and determines a correction value from the changes to eliminate an error of a beam emission axis to the straight line path of the vehicle with respect to the horizontal direction.

The radar apparatus, shown in FIG. 1B, further includes a first inhibiting unit 26 which inhibits the target detecting unit 24 from outputting the scanned angle and the relative distance of the target to the correction value determining unit 25 during a predetermined period prior to occurrence of a roadway lane change when the target which moves forward in a roadway lane different from a roadway lane of the vehicle has made the roadway lane change.

The radar apparatus, shown in FIG. 1B, further includes a second inhibiting unit 27 which inhibits, when the vehicle operates in a curved path, the target detecting unit 24 from outputting the scanned angle and the relative distance of the target to the correction value determining unit 25 within a period from a time the target, moving forward in the different roadway lane, enters the curved path to a time the vehicle enters the curved path.

Further, the present invention is not limited to the above-described embodiments, and variations and modifications may be made without departing from the scope of the present invention.

What is claimed is:

1. A radar apparatus of an automotive vehicle, which corrects a beam emission axis in accordance with a correction value to eliminate an error of the beam emission axis to a straight line path of the vehicle with respect to a horizontal direction, comprising:

a radar unit outputting signals at intervals of a predetermined time, each signal indicating data of a position of a target at an output time;

a position detecting unit detecting data of the position of the target from each of the signals output by said radar unit when the vehicle operates in the straight line path; and a correction value determining unit generating a set of errors of the beam emission axis with respect to the horizontal direction so that an average of the errors with respect to each of the signals is determined from the data detected by said position detecting unit, and determining a correction value by taking an average of said averages of the errors with respect to all the signals.

2. The radar apparatus according to claim 1, wherein said position detecting unit outputs the detected data to said correction value determining unit when a width of the target is greater than a minimum vehicle width and smaller than a maximum vehicle width.

3. The radar apparatus according to claim 1, wherein said position detecting unit provides said correction value determining unit with the detected data when the target is detected as being an advancing vehicle which operates forward in front of the vehicle in a roadway lane.

4. The radar apparatus according to claim 1, wherein said position detecting unit outputs the detected data to said correction value determining unit when the target presently detected at a present output time is the same as the target previously detected at a previous output time.

5. A radar apparatus of an automotive vehicle, which corrects a beam emission axis in accordance with a correction value to eliminate an error of the beam emission axis to a straight line path of the vehicle with respect to a horizontal direction, comprising:

a radar unit outputting signals at intervals of a predetermined time, each signal indicating a scanned angle of a target as well as a relative distance of the target at an output time;

a target detecting unit detecting the scanned angle and the relative distance of the target from each of the signals output by said radar unit when the target moves forward in a roadway lane different from a roadway lane of the vehicle or when the target is a fixed road-side object; and a correction value determining unit generating changes of the scanned angle and the relative distance of the target detected by said target detecting unit within a period from an initial output time to a final output time, and determining a correction value from said changes so that an error of the beam emission axis to the straight line path of the vehicle with respect to the horizontal direction is eliminated.

6. The radar apparatus according to claim 5, further comprising:

a first inhibiting unit inhibiting said target detecting unit from outputting the scanned angle and the relative distance of the target to said correction value determining unit during a predetermined period prior to occurrence of a roadway lane change when the target which moves forward in the different roadway lane has made the roadway lane change.

7. The radar apparatus according to claim 5, further comprising:

a second inhibiting unit inhibiting, when the vehicle operates in a curved path, said target detecting unit from outputting the scanned angle and the relative distance of the target to said correction value determining unit within a period from a time the target, moving forward in the different roadway lane, enters the curved path to a time the vehicle enters the curved path.

8. The radar apparatus according to claim 5, wherein said correction value determining unit determines a correction value $\Theta$ in accordance with the equation:

$$\Theta = \tan^{-1}\left[(R1 \sin d\Theta_1 - R2 \sin d\Theta_2)/(R1 \cos d\Theta_1 - R2 \cos d\Theta_2)\right]$$

where R1 is a relative distance of the target at the initial output time, $d\Theta_1$ is a scanned angle thereof, R2 is a relative distance of the target at the final output time, and $d\Theta_2$ is a scanned angle thereof.

* * * * *

UNITED STATES PATENT AND TRADEMARK OFFICE
CERTIFICATE OF CORRECTION

PATENT NO. : 5,670,963
DATED : September 23, 1997
INVENTOR(S) : Yuichi KUBOTA, et al.

It is certified that error appears in the above-indentified patent and that said Letters Patent is hereby corrected as shown below:

Column 2, line 3, change "automotibe" to --automotive--.

Column 3, line 11, after "12" insert a comma.

Column 4, line 36, change "sinθ1 " to --sin ⊗1--.

Column 6, line 43, after "distance" insert a comma and delete "Ymin,".

Column 8, line 46, change "e." to --⊗--.

Column 10, line 29, delete the parenthesis before "1$_i$".

Column 16, line 10, change "d𝛉$_2$)/(R1 cos" to --dx$_2$ / (R1 cos--.

Signed and Sealed this

Second Day of June, 1998

Attest:

BRUCE LEHMAN

Attesting Officer

Commissioner of Patents and Trademarks